United States Patent [19]
Kamaga

[11] Patent Number: 4,962,418
[45] Date of Patent: Oct. 9, 1990

[54] COLOR PICTURE DISPLAY APPARATUS

[75] Inventor: Ryuichi Kamaga, Utsunomiya, Japan

[73] Assignee: Kabushiki Kaisha Toshiba, Kawasaki, Japan

[21] Appl. No.: 213,827

[22] Filed: Jun. 30, 1988

[30] Foreign Application Priority Data

Jun. 30, 1987 [JP] Japan .................... 62-160899
Jun. 24, 1988 [JP] Japan .................... 63-154879

[51] Int. Cl.⁵ .................................... H04N 9/73
[52] U.S. Cl. ........................ 358/29; 358/27; 358/28
[58] Field of Search .................... 358/27, 28, 29

[56] References Cited

U.S. PATENT DOCUMENTS

| | | | |
|---|---|---|---|
| 3,456,068 | 7/1969 | Wilhelmy | 358/28 |
| 3,479,448 | 11/1969 | Kollsman | 358/29 |
| 3,573,352 | 4/1971 | Fujita | 358/29 |
| 4,207,589 | 6/1980 | Kawasaki | 358/28 |
| 4,379,292 | 4/1983 | Minato et al. | 358/29 |
| 4,706,108 | 11/1987 | Kumagai et al. | 358/29 |
| 4,733,227 | 3/1988 | Kanema et al. | 358/27 |
| 4,746,970 | 5/1988 | Hosokawa et al. | 358/29 |
| 4,831,437 | 5/1989 | Nishioka et al. | 358/28 |

Primary Examiner—John W. Shepperd
Attorney, Agent, or Firm—Oblon, Spivak, McClelland, Maier & Neustadt

[57] ABSTRACT

In a color picture display apparatus for monitoring colors of a picture displayed on a display such as a CRT based on picture signals picked up by a imaging camera, in which a signal processor operates luminous characteristics such as chromaticity and luminance of the actual display, obtained with reference to reference color signals, and ideal luminous characteristics such as chromaticity and reference white chromaticity of an ideal display to obtain correction values, and a corrector corrects the picture signals on the basis of the correction values to obtain corrected picture signals to be fed to the display for displaying a corrected picture. The correction values may be stored in a memory.

8 Claims, 4 Drawing Sheets

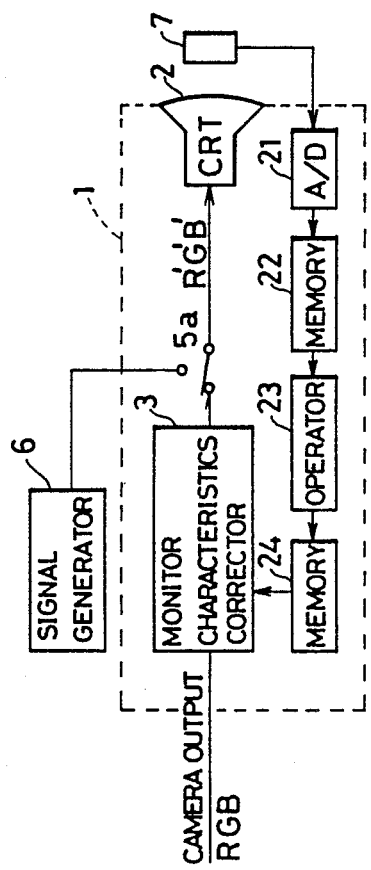
FIG.7
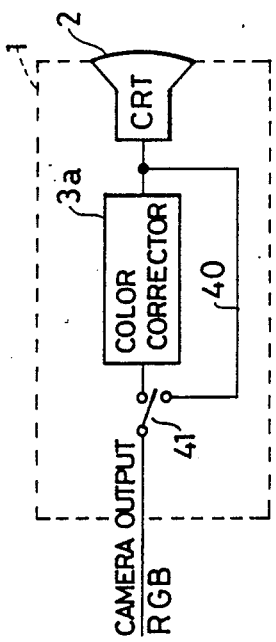
FIG.9
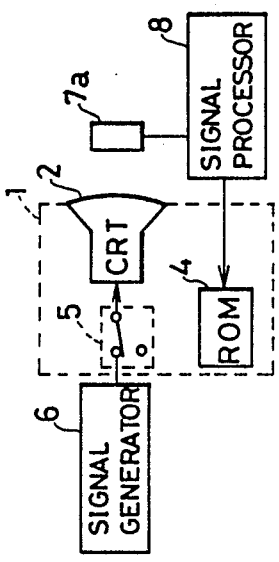
FIG.8
FIG.10

COLOR PICTURE DISPLAY APPARATUS

BACKGROUND OF THE INVENTION

1. Field of the Invention

The present invention relates to a color picture display apparatus for monitoring colors of a picture based on picture signals picked up by a imaging camera, which is capable of displaying the picture of desired colors such as actual colors on different displays regardless of different luminous characteristics thereof.

2. Description of the Prior Art

In a conventional color picture display apparatus for monitoring colors of a picture for use in an electronic endoscope or the like, a color correction of a monitor is carried out by determining exponential factors of gamma characteristics to 2.2, that is, by raising to 1/2.2 power in a photographing camera side. However, in an actual monitor, the exponential factors of the gamma characteristics are not always 2.2, and further the gamma characteristics values are not the same in luminous bodies of three colors such as red, green and blue. The chromaticity of the luminous bodies of the three colors are different from one another depending on different manufacturers, and the chromaticity of the luminous bodies varies even when the luminous bodies are manufactured by the same manufacturer. Further, in the same monitor, it is difficult to maintain the same colors from the same color picture signals R, G and B of the three colors by the deterioration of the luminous bodies due to a change with the passage of time and the like.

Therefore, in the conventional color picture display apparatus of this kind, even when the color correction of the color monitor is carried out in the camera side, the desired colors, for instance, the actual colors cannot be obtained very often, in practice. Such color differences of the pictures displayed on a display brings about a large trouble in the color monitor for the electronic endoscope which requires the real colors of the pictures on the monitor as an important factor for a diagnosis.

In another conventional color picture display apparatus, monitor characteristics of each color display are measured, and then color correction values are obtained from the monitor characteristics. Then, the picture signals obtained by photographing the object are corrected on the basis of the color correction values. However, usually, such a measuring apparatus is not provided to each color monitor but to a particular place such as a factory and a service station. Accordingly, this correction operation can be performed only on forwarding the color monitor from the factory or on inspecting the color monitor in the service station.

SUMMARY OF THE INVENTION

Accordingly, it is an object of the present invention to provide a color picture display apparatus, free from the aforementioned disadvantages and defects of the prior art, which is capable of displaying a picture of desired colors such as actual colors on different monitors regardless of different luminous characteristics thereof.

In accordance with one aspect of the present invention, there is provided a color picture display apparatus comprising means for displaying a picture on the basis of picture signals picked up by an optoelectronic device, means for processing luminous characteristics of the displaying means, detected with reference to reference color signals for reference colors, and ideal luminous characteristics of an ideal display to obtain correction values, and means for correcting the picture signals on the basis of the correction values to obtain corrected picture signals to be fed to the displaying means for displaying a corrected picture.

In a preferred embodiment, the correction values may be stored in storing means such as a memory.

The color picture display apparatus also includes means for detecting the luminous characteristics of the displaying means. The detecting means includes color detector elements. The color picture display apparatus also includes means for defining a display surface of the displaying means to a normal picture display area for displaying the picture based on the picture signals and a reference color display area for displaying the reference colors of the reference color signals, in which the color detector elements are arranged in front of the reference color display area.

BRIEF DESCRIPTION OF THE DRAWINGS

These and other objects, features and advantages of the present invention will more fully appear from the following description of the preferred embodiments with reference to the accompanying drawings, in which:

FIG. 7 is a block diagram of a second embodiment of a color picture display apparatus according to the present invention;

FIG. 8 is a fragmentary block diagram of a third embodiment of a color picture display apparatus according to the present invention;

FIG. 9 is a fragmentary block diagram of a fourth embodiment of a color picture display apparatus according to the present invention;

FIG. 10 is a fragmentary block diagram of a fifth embodiment of a color picture display apparatus according to the present invention;

DESCRIPTION OF THE PREFERRED EMBODIMENTS

Figure 1:
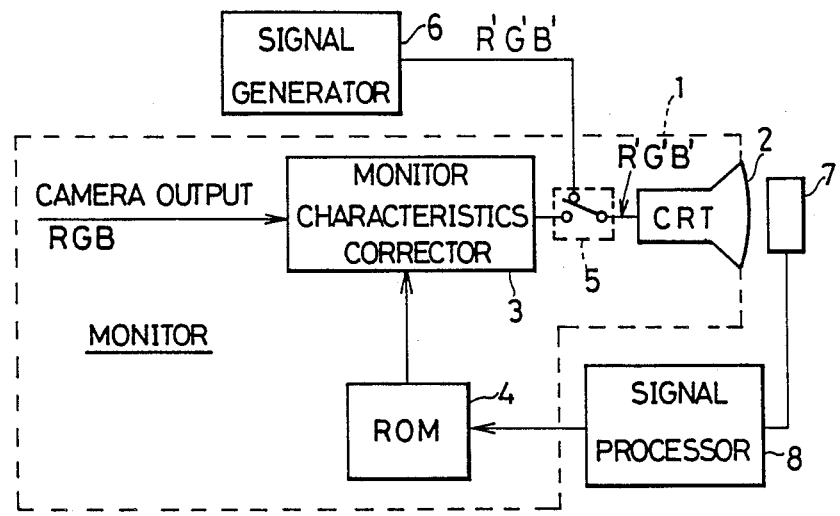
FIG. 1 is a block diagram of a first embodiment of a color picture display apparatus according to the present invention.

Referring now to the drawings, wherein like reference characters designate like or corresponding parts throughout the several views, there is shown in FIG. 1 the first embodiment of a color picture display apparatus for use in an electronic endoscope or the like, according to the present invention.

In the drawing, the color picture display apparatus comprises a monitor 1 including a color display 2 such as a CRT, a monitor characteristics corrector 3, a ROM 4 and a switch 5, for monitoring a color picture of picture signals R, G and B of three colors, picked up by an optoelectronic device such as a charge coupled device (CCD) camera and the like, a signal generator 6 for generating test color signals R', G' and B' to the display 2 via the switch 5 in order to obtain luminous characteristics such as chromaticity and luminance or illuminance of luminous bodies of the display 2, a detector 7 for measuring the characteristics such as the chromaticity and luminance or illuminance of the luminous bodies of the display 2 on the basis of the test color signals output from the signal generator 6, and a signal processor 8 for obtaining correction values for the picture signals R, G and B from the luminous characteristics such as the chromaticity and luminance or illuminance of the luminous bodies of the display 2 and the predetermined ideal luminous characteristics such as chromaticity and reference white chromaticity of ideal luminous bodies of an ideal display. In the monitor 1, the correction values obtained by the signal processor 8 are stored in the ROM 4 and are read out thereof when required. The readout correction values are fed from the ROM 4 to the corrector 3, and the picture signals R, G and B picked up by the camera are also sent to corrector 3. In the corrector 3, the picture signals R, G and B are corrected according to the correction values, as hereinafter described in detail, to obtain corrected picture signals R', G' and B' to be fed to the display 2 via the switch 5. The switch 5 selects either the corrector 3 or the signal generator 6 to connect either one to the display 2.

The principle of the present invention will be described in connection with FIGS. 2 to 4.

Figure 2:
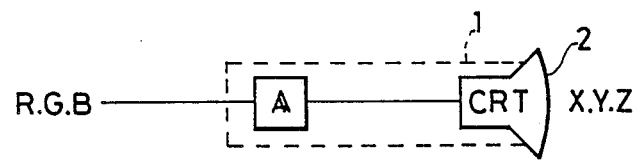
FIGS. 2 to 4 are block diagrams for explaining the principle of the present invention of FIG. 1.

When the monitor 1 including the display 2 has the ideal characteristics, the display 2 includes the ideal luminous bodies having linear characteristics with respect to the input picture signals R, G and B, and accordingly the colors on the display surface of the display 2 are determined by a 3×3 matrix [A] determined by the ideal chromaticity and reference white chromaticity of the ideal luminous bodies, as shown in FIG. 2.

Figure 3:
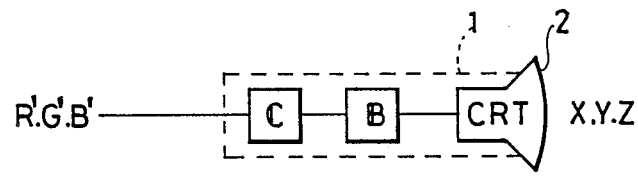
Figure 4:
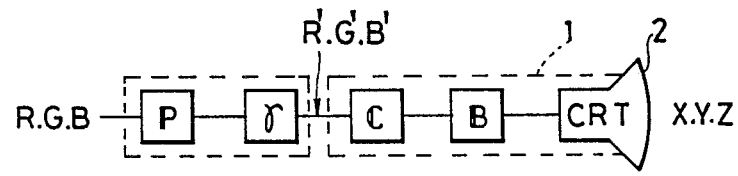

However, in fact, an actual display including actual luminous bodies having nonlinear characteristics possesses inherent gamma characteristics [C] and a matrix [B] determined by the inherent actual characteristics of the actual luminous bodies because the chromaticity and luminance of the actual luminous bodies of the actual display are different from those of the ideal display, as shown in FIG. 3. Accordingly, in order to obtain the same colors displayed on the actual display as the colors on the ideal display, other picture signals R', G' and B' corresponding to the actual gamma characteristics [c] and the actual characteristics matrix [B] are input, instead of the picture signals R, G and B input to the ideal display. Therefore, when a monitor characteristics corrector including a chromaticity correction part [P] and a gamma correction part [γ] for converting the picture signals R, G and B into other picture signals R', G' and B' is provided in the monitor, the same colors as those on the ideal display can be displayed on the actual display with reference to the picture signals R, G and B, as shown in FIG. 4

Then, a method of obtaining the correction values for the conversion of the picture signals R, G and B into the corrected picture signals R', G' and B' will be described in detail.

Assuming that three exciting values of the three colors on the display are X, Y and Z, the relation between the picture signals R, G and B to be input to the ideal display and the exciting values X, Y and Z is expressed in the following formula:

$$\begin{pmatrix} X \\ Y \\ Z \end{pmatrix} = [A] \begin{pmatrix} R \\ G \\ B \end{pmatrix} \quad (1)$$

wherein [A] is the matrix determined by the predetermined ideal chromaticity and reference white chromaticity of the ideal luminous bodies of the ideal display.

Then, the relation between the corrected picture signals R', G' and B' to be input to the actual display and the exciting values X, Y and Z is expressed in the following formula:

$$\begin{pmatrix} X \\ Y \\ Z \end{pmatrix} = [B] \begin{pmatrix} R'^{\gamma R} \\ G'^{\gamma G} \\ B'^{\gamma B} \end{pmatrix} \quad (2)$$

wherein [B] is the matrix determined by the chromaticity and luminance or illuminance of the luminous bodies of the actual display, and γR, γG and γB are the gamma characteristics [C] of the luminous bodies of the actual display.

From formulas (1) and (2), the relation between the picture signals R, G and B and the corrected picture signals R', G' and B' is written in the following formula:

$$\begin{pmatrix} R'^{\gamma R} \\ G'^{\gamma G} \\ B'^{\gamma B} \end{pmatrix} = [B]^{-1} \times [A] \begin{pmatrix} R \\ G \\ B \end{pmatrix} \quad (3)$$

Then, assuming that $[B]^{-1} = [A] = [P]$ and matrix [P] are $P_{ij}$ (i, j=i, 2, 3), the corrected picture signals R', G' and B' are represented in the following formula:

$$R' = (P_{11} \cdot R + P_{12} \cdot G + P_{13} \cdot B)^{1/\gamma R}$$

$$G' = (P_{21} \cdot R + P_{22} \cdot G + P_{23} \cdot B)^{\gamma G}$$

$$B' = (P_{31} \cdot R + P_{32} \cdot G + P_{33} \cdot B)^{\gamma B} \quad (4)$$

Therefore, formula (4) means that the corrected picture signals R', G' and B' can be obtained from the picture signals R, G and B, and the correction values, that is, the elements $P_{ij}$ of the matrix [P] and the gamma characteristics of the luminous bodies of the actual display.

In this embodiment, the elements $P_{ij}$ of the matrix [P] and the gamma characteristics will be obtained as follows: The matrix [A] of formula (1) is represented in formula (5):

$$[A] = K \begin{bmatrix} \dfrac{\Delta_{11}}{\Delta_{11}x_W - \Delta_{21}y_W + \Delta_{31}z_W} & \dfrac{-\Delta_{21}}{\Delta_{11}x_W - \Delta_{21}y_W + \Delta_{31}z_W} & \dfrac{\Delta_{31}}{\Delta_{11}x_W - \Delta_{21}y_W + \Delta_{31}z_W} \\ \dfrac{-\Delta_{12}}{-\Delta_{12}x_W + \Delta_{22}y_W - \Delta_{32}z_W} & \dfrac{-\Delta_{22}}{-\Delta_{12}x_W + \Delta_{22}y_W - \Delta_{32}z_W} & \dfrac{-\Delta_{32}}{-\Delta_{12}x_W + \Delta_{22}y_W - \Delta_{32}z_W} \\ \dfrac{\Delta_{13}}{\Delta_{13}x_W - \Delta_{23}y_W + \Delta_{33}z_W} & \dfrac{-\Delta_{23}}{\Delta_{13}x_W - \Delta_{23}y_W + \Delta_{33}z_W} & \dfrac{\Delta_{33}}{\Delta_{13}x_W - \Delta_{23}y_W + \Delta_{33}z_W} \end{bmatrix}^{-1} \quad (5)$$

wherein $\Delta = \begin{vmatrix} x_R & x_G & x_B \\ y_R & y_G & y_B \\ z_R & z_G & z_B \end{vmatrix}$, wherein $x_i$, $y_i$ and $z_i$ (i=R, G, B) are chromaticity coordinates of three primary colors, obtained from the predetermined chromaticity of the three primary colors of the ideal luminous bodies of the ideal display, wherein $\Delta_{ij}$ represents a small determinant of i-rows by j-columns of $\Delta$ wherein $x_W$, $y_W$ and $z_W$ are reference white chromaticity coordinates obtained from the predetermined reference white chromaticity of the ideal luminous bodies of the ideal display, and wherein K is a constant.

Then, the matrix [B] of formula (2) is represented in formula (6):

$$[B] = \begin{bmatrix} k_R \times \dfrac{x_R^*}{y_R^*} & k_G \times \dfrac{x_G^*}{y_G^*} & k_B \times \dfrac{x_B^*}{y_B^*} \\ k_R & k_G & k_B \\ k_R \times \dfrac{z_R^*}{y_R^*} & k_G \times \dfrac{z_G^*}{y_G^*} & k_B \times \dfrac{z_B^*}{y_B^*} \end{bmatrix} \quad (6)$$

wherein $x_i^*$, $y_i^*$ and $z_i^*$ (i=R, G, B) are chromaticity coordinates of three primary colors, obtained from the chromaticity of the three primary colors of the luminous bodies of the actual display, and wherein $k_i$ (i=R, G, B) are constants. The constants $k_i$ and the gamma characteristics $\gamma_i$ (i=R, G, B) are obtained from the luminance $L_R$, $L_G$ and $L_B$ of the luminous bodies of the actual display in accordance with formula (7):

$$L_R = K_R \cdot R'^{\gamma_R}$$

$$L_G = K_G \cdot G'^{\gamma_G}$$

$$L_B = K_B \cdot B'^{\gamma_B} \quad (7)$$

wherein R', G' and B' are test color signals generated by the signal generator 6 to the display 2.

In this case, the chromaticity and luminance of the luminous bodies of the actual display 2 are measured by the detector 7 such as a colorimeter positioned in front of the display surface of the display 2 while the test color signals R', G' and B' corresponding to the corrected picture signals R', G' and B' are input to the display 2. The chromaticity and luminance of the luminous bodies of the display 2 may be measured with several different values of each of the three primary colors at several points of the display surface of the display 2. Then, the measured values are sent from the detector 7 to the signal processor 8 and are processed in a proper manner such as the minimum involution method and the like to obtain the chromaticity coordinates of the three primary colors, the constants $k_i$ and the gamma characteristics $\gamma_i$ of the luminous bodies of the display 2.

Then, in the signal processor 8, the matrix [P] is operated from the obtained matrices [A] and [B] described above, and the elements $P_{ij}$ of the matrix [P] are obtained in accordance with formula (8):

$$[B]^{-1} \times [A] = [P] = K \begin{bmatrix} P_{11} & P_{12} & P_{13} \\ P_{21} & P_{22} & P_{23} \\ P_{31} & P_{32} & P_{33} \end{bmatrix} = \quad (8)$$

$$\left( \dfrac{\dfrac{1}{k_R y_R^*} \begin{vmatrix} x_R^* & x_G & x_B \\ y_R^* & y_G & y_B \\ z_R^* & z_G & z_B \end{vmatrix}}{\Delta_{11}x_W - \Delta_{21}y_W + \Delta_{31}z_W} \quad \dfrac{\dfrac{1}{k_R y_G^*} \begin{vmatrix} x_G^* & x_G & x_B \\ y_G^* & y_G & y_B \\ z_G^* & z_G & z_B \end{vmatrix}}{\Delta_{11}x_W - \Delta_{21}y_W + \Delta_{31}z_W} \quad \dfrac{\dfrac{1}{k_R y_B^*} \begin{vmatrix} x_B^* & x_G & x_B \\ y_B^* & y_G & y_B \\ z_B^* & z_G & z_B \end{vmatrix}}{\Delta_{11}x_W - \Delta_{21}y_W + \Delta_{31}z_W} \right.$$

$$K \begin{pmatrix} \frac{1}{k_{G}y_{R}^{*}}\begin{vmatrix} x_R & x_R^* & x_B \\ y_R & y_R^* & y_B \\ z_R & z_R^* & z_B \end{vmatrix} & \frac{1}{k_{G}y_{G}^{*}}\begin{vmatrix} x_R & x_G^* & x_B \\ y_R & y_G^* & y_B \\ z_R & z_G^* & z_B \end{vmatrix} & \frac{1}{k_{G}y_{B}^{*}}\begin{vmatrix} x_R & x_B^* & x_B \\ y_R & y_B^* & y_B \\ z_R & z_B^* & z_B \end{vmatrix} \\ \hline -\Delta_{12}x_W + \Delta_{22}y_W - \Delta_{32}z_W & -\Delta_{12}x_W + \Delta_{22}y_W - \Delta_{32}z_W & -\Delta_{12}x_W + \Delta_{22}y_W - \Delta_{32}z_W \\ \\ \frac{1}{k_{B}y_{R}^{*}}\begin{vmatrix} x_R & x_G & x_R^* \\ y_R & y_G & y_R^* \\ z_R & z_G & z_R^* \end{vmatrix} & \frac{1}{k_{B}y_{G}^{*}}\begin{vmatrix} x_R & x_G & x_G^* \\ y_R & y_G & y_G^* \\ y_R & z_G & z_G^* \end{vmatrix} & \frac{1}{k_{B}y_{B}^{*}}\begin{vmatrix} x_R & x_G & x_B^* \\ y_R & y_G & y_B^* \\ z_R & z_G & z_B^* \end{vmatrix} \\ \hline \Delta_{13}x_W - \Delta_{23}y_W + \Delta_{33}z_W & \Delta_{13}x_W - \Delta_{23}y_W + \Delta_{33}z_W & \Delta_{13}x_W - \Delta_{23}y_W + \Delta_{33}z_W \end{pmatrix}$$

$$-1 \times [A] = [P] = K \begin{vmatrix} P_{11} & P_{12} & P_{13} \\ P_{21} & P_{22} & P_{23} \\ P_{31} & P_{32} & P_{33} \end{vmatrix}$$

Therefore, the elements $P_{ij}$ of the matrix [P] obtained from the chromaticity and luminance of the luminous bodies of the actual display and the predetermined chromaticity and reference white chromaticity of the ideal luminous bodies of the ideal display, and the gamma characteristics $\gamma R$, $\gamma G$ and $\gamma B$ obtained from the luminance of the luminous bodies of the actual display are stored in the ROM 4 as the correction values, and, when the picture signals R, G and B are corrected to the picture signals R', G' and B' in the monitor characteristics corrector 3, such correction values are then read out of the ROM 4 to the corrector 3.

Figure 5:
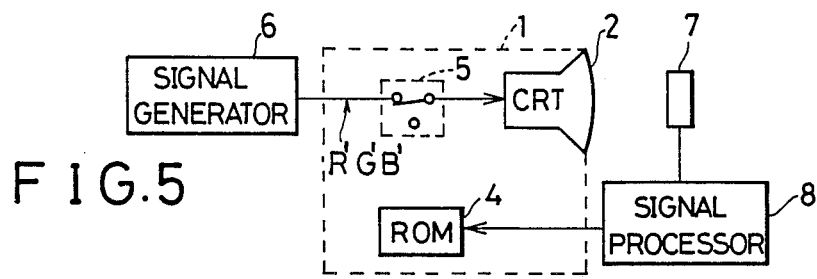
FIG. 5 is a fragmentary block diagram for explaining a correction value measurement mode of the apparatus of FIG. 1.

FIG. 5 shows a correction value measurement mode of the color picture display apparatus of FIG. 1. The signal generator 6 is coupled to the monitor 1 and the switch 5 is turned to connect the signal generator 6 to the display 2. Then, the detector 7 is set in front of the display surface of the display 2. While the signal generator 6 outputs the test color signals R'G' and B' to the display 2 in consecutive order, the detector 7 measures the characteristics such as the chromaticity and luminance of the luminous bodies of the display 2 every time. After the measurement of the characteristics of the luminous bodies is finished, the measured values are sent to the signal processor 8 and the predetermined characteristics such as ideal chromaticity and reference white chromaticity of the ideal luminous bodies of the ideal display are separately fed to the signal processor 8. In the signal processor 8, the elements $P_{ij}$ and the gamma characteristics are obtained as the correction values, as described above, and are then stored in the ROM 4.

Figure 6:
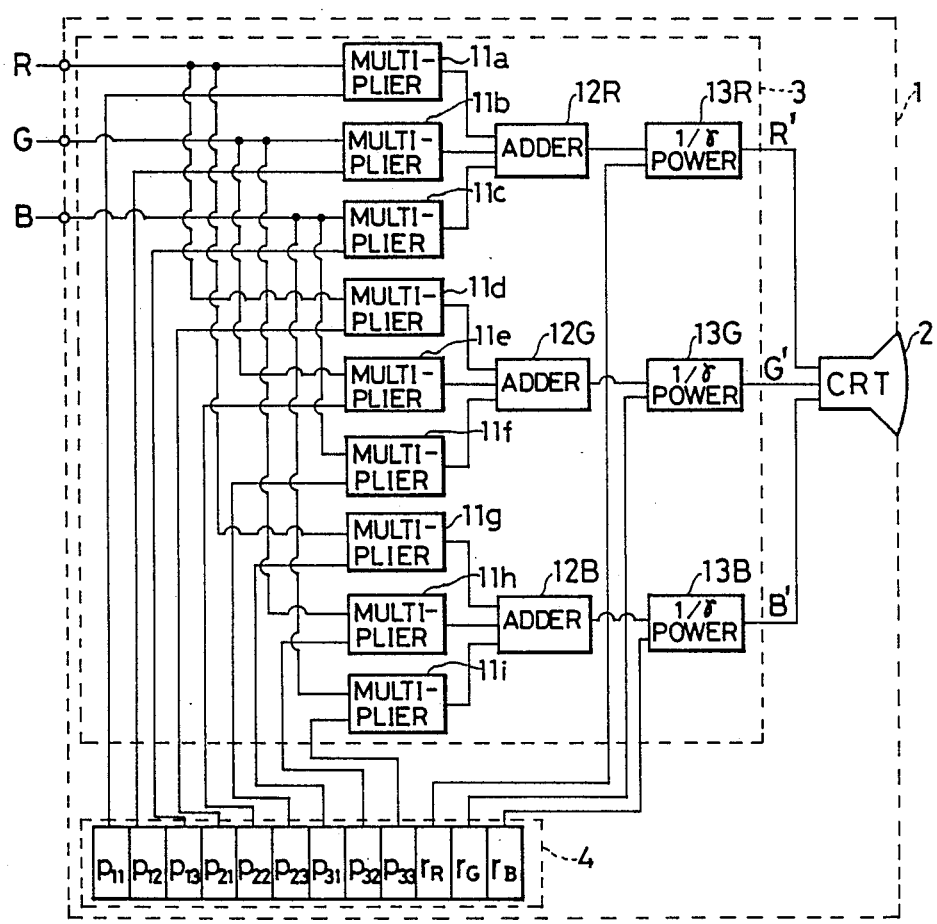
FIG. 6 is a block diagram of a monitor part of the apparatus of FIG. 1.

In FIG. 6, there is shown a monitor 1 including the color display 2, the monitor characteristics corrector 3 and the ROM 4 of the color picture display apparatus of FIG. 1. The corrector 3 includes nine multipliers 11a to 11i, three adders 12R, 12G and 12B and three 1/$\gamma$-power calculators 13R, 13G and 13B, and the ROM 4 includes 12 memory blocks for storing $P_{11}$, $P_{12}$, $P_{13}$, $P_{21}$, $P_{22}$, $P_{23}$, $P_{31}$, $P_{32}$, $P_{33}$, $\gamma R$, $\gamma G$ and $\gamma B$, which are connected to the multipliers 11a, 11b, 11c, 11d, 11e, 11f, 11g, 11h and 11i and 1/$\gamma$-power calculators 13R, 13G and 13B, respectively. The picture signals R, G and B are input to the multipliers 11a, 11d and 11g, the multipliers 11b, 11e and 11h and the multipliers 11c, 11f and 11i, respectively. The outputs of the multipliers 11a, 11b and 11c, the multipliers 11d, 11e and 11f and the multipliers 11g, 11h and 11i are fed to the adders 12R, 12G and 12B, respectively. The outputs of the adders 12R, 12G and 12B are input to the 1/$\gamma$-power calculators 13R, 13G and 13B, respectively.

Hence, the multipliers 11a, 11b, 11c, 11d, 11e, 11f, 11g, 11h and 11i operate $P_{11}$.R, $P_{12}$.G, $P_{13}$.B, $P_{21}$.R, $P_{22}$.G, $P_{23}$.B, $P_{31}$.R, $P_{32}$.G and $P_{33}$.B, respectively, and the adders 12R, 12G and 12B operate $P_{11}.R + P_{12}.G + P_{13}.B$, $P_{21}.R + P_{22}.G + P_{23}.B$ and $P_{31}.R + P_{32}.G + P_{33}.B$, respectively, in accordance with formula (4). Then, the 1/$\gamma$-power calculators 13R, 13G and 13B operate $(P_{11}.R + P_{12}.G + P_{13}.B)^{1/\gamma B}$, $(P_{21}.R + P_{22}.G + P_{23}.B)^{1/\gamma G}$ and $(P_{31}.R + P_{32}.G + P_{33}.B)^{1/\gamma B}$, respectively, as the corrected picture signals R'G' and B', respectively, which are fed to the display 2.

It is readily understood from the description of the first embodiment that the differences among the colors displayed on the different displays can be removed and thus the same colors can be reproduced on the different displays from the same picture signals picked up by the imaging camera, and that the color variation on the different displays can be prevented and hence the color pictures can be displayed in the best conditions. Consequently, the comparison of the pictures can be accurately performed, and the diagnosis using the colors can be readily carried out. Further, in the camera side, no gamma factor correction is required and therefore the burden of the camera side can be reduced.

Further, in an endoscope including a TV camera mounted at a viewing window of a scope, the present invention can be effectively applied in the same manner as described above. Further, when the real time process can not be so required, the number of the multipliers of the corrector 3 may be reduced, for instance, to three for the common use. When the chromaticity of the luminous bodies of the actual display is not so different from that of the ideal display, since the elements $P_{ij}$ may become approximately the naught, the number of the multipliers of the corrector 3 may be reduced, and the adders of the corrector 3 may be omitted.

In FIG. 7, there is shown the second embodiment of the apparatus according to the present invention. In this embodiment, instead of the ROM 4 and the signal processor 8 of the first embodiment, the monitor 1 includes an analog-digital (A/D) converter 21 for converting analog signals measured by the detector 7 into measured digital signals, a memory 22 for once storing the measured digital signals output from the A/D converter 21, an operator 23 for obtaining the correction values in the same manner as the first embodiment described above, and a memory 24 for storing the correction values obtained by the operator 23. The monitor also includes an automatic correction switch 5a, instead of the switch 5 of the first embodiment, for automatically selecting either the corrector 3 or the signal generator 6 to connect it to the display 2 according to the system operation. The correction values stored in the memory 24 are read out thereof and are sent to the monitor characteristics corrector 3 when the picture signals R, G and B are corrected to the corrected picture signals R', G' and B'.

Then, the operation of the second embodiment of the apparatus will be described as follows. When the automatic correction switch 5a is switched on, it selects the signal generator 6 to connect it to the display 2. Then, the normal display state is cancelled, and the detector 7 is set in front of the display surface of the display 2. Next, one test color signal is fed to the display 2 via the switch 5a, and the display 2 displays the color of the test color signal thereon. At this time, the detector 7 measures the chromaticity and luminance of the color displayed on the display and the values measured by the detector 7 are sent to the memory 22 through the A/D converter 21 and are once stored in the memory 22. Then, other test color signals are sent to the display 2 in order, and the measured values are consecutively stored in the memory 22 in the same manner as above. When the necessary measured values are all stored in the memory 22, the measurement is finished.

The necessary measured values are then read out of the memory 22 and are fed to the operator 23, and the operator 23 operates the correction values from the necessary measured values and the predetermined characteristics values of the ideal display in the same manner as the first embodiment. The correction values are sent from the operator 23 to the memory 24 and are stored therein. Hence, the automatic correction is now finished and the automatic correction switch 5a automatically selects the corrector 3 to connect it to the display 2, thereby returning to the normal state. When the automatic correction is finished, the apparatus may allow a bell to ring in order to inform the end of the automatic correction.

In this embodiment, the same effects and advantages as those obtained in the first embodiment described above can be resulted. Further, the adjustment of the colors may be readily conducted by clients and users in addition to by engineers on forwarding from the factory or on inspecting in the service station.

In FIG. 8, there is shown the correction value measurement mode of the third embodiment of the apparatus according to the present invention, having the same construction except a colorimeter 7a as the detector. In this embodiment, the signal generator 6 successively outputs the predetermined test color signals R', G' and B' to the display 2, and the display 2 displays the predetermined colors while the colorimeter 7a measures the characteristics such as the chromaticity and luminance of the luminous bodies of the display 2 one after another. At this time, the values measured by the colorimeter 7a are sent to the signal processor 8 and are once stored therein in sequence. After the measurement of all necessary values is finished, the signal processor 8 operates the correction values in the same manner as described above, and the obtained correction values are stored in the ROM 4.

FIG. 9 illustrates the fourth embodiment of the apparatus according to the present invention, including a coordinates selector 31 for selecting a position on the display, a chromaticity display 32, connected to the ROM 4, for displaying the chromaticity of the selected position, and a picture signal readout 33, connected to the coordinates selector 31 and the ROM 4, for reading out the picture signals R, G and B of the selected position.

In this embodiment, an operator selects a position whose chromaticity is to be known on the display 2 by the coordinates selector 31 while the operator watches the picture displayed on the display 2. The picture signals R, G and B of the selected position are read out by the picture signal readout 33, and then the picture signals R, G and B are converted by the correction values read out of the ROM 4 to obtain the chromaticity of the selected position. The obtained chromaticity of the selected position is reproduced on the chromaticity display 32. When chromaticity of another position on the display is to be known, the chromaticity of another position may be displayed on the chromaticity display 33 in the same manner as described above after clearing up the previous chromaticity, or may be displayed on the chromaticity display 33 along with the previous chromaticity for the comparison purpose.

Therefore, in this case, since the chromaticity of the selected position on the display 2 now observed by the operator is displayed on the chromaticity display 32, there is no feeling of visual disorder, and, when the diagnosis is performed by evaluating the colors on the display, its reliability can be highly improved Further, since the monitor can be used like the colorimeter, the evaluation standard of the colors can be readily understood.

In FIG. 10, there is shown the fifth embodiment of the apparatus according to the present invention, including a by-path 40 for shortcutting a color corrector 3a for correcting the colors of the picture signals R, G and B to the desired colors, and a switch 41 for selecting either the color corrector 3a or the by-path 40 to connect it to the display 2. In this embodiment, usually the display 2 displays the picture having the desired colors corrected by the color corrector 3a. When the comparison or evaluation of the colors is practiced, the switch 41 is turned on in order to allow the picture signals to avoid the color corrector 3a and to directly pass to the display 2, and the uncorrected picture is displayed on the display 2. When the characteristics of the display of the monitor are measured, the measured values may be obtained with the same reference levels by turning on the switch 41.

Figure 11:
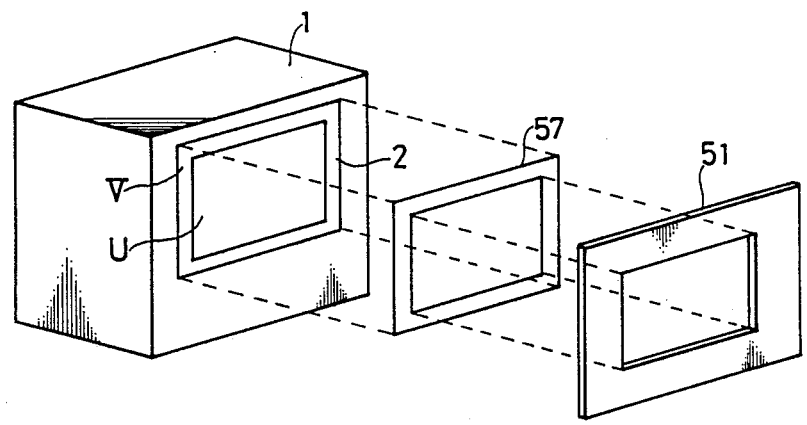
FIG. 11 is an exploded perspective view of a sixth embodiment of a color picture display apparatus according to the present invention.
Figure 12:
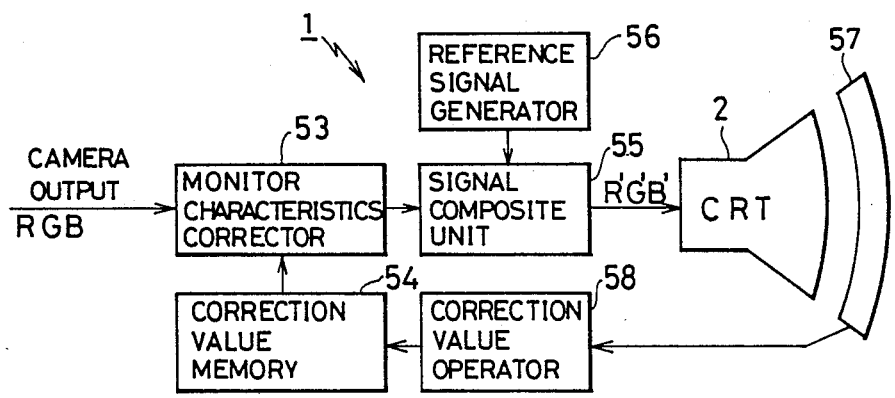
FIG. 12 is a block diagram of the sixth embodiment of the apparatus of FIG. 11.
Figure 13:
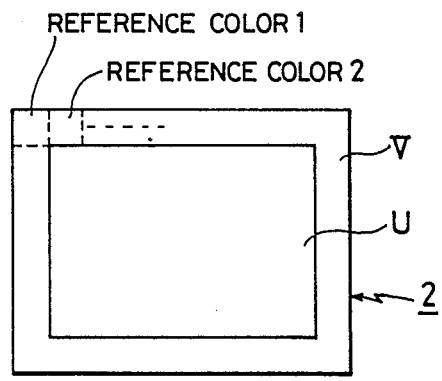
FIG. 13 is a front view of a display surface of a display of the apparatus shown in FIG. 11.

In FIGS. 11 to 13, there is shown the sixth embodiment of the apparatus according to the present invention. In this embodiment, as shown in FIGS. 11 and 13, the display surface of the display 2 is divided into two parts, that is, a normal picture display area U having a rectangular shape occupies a large central portion for displaying the picture on the basis of the picture signals R, G and B picked up by the camera, and a reference color display area V having a rectangular frame shape occupies a peripheral portion for displaying reference colors of reference color signals R', G' and B' generated by a reference signal generator 56.

As shown in FIG. 11, color detector elements 57 for measuring the characteristics such as the chromaticity and luminance or illuminance of the luminous bodies of the display 2 are detachably arranged onto the display 2 in the rectangular frame shape so as to cover the reference color display area V of the display 2, and a cover 51 for covering the color detector elements, having the same rectangular frame shape as that of the arrangement of the color detector elements 57, is detachably attached to the color detector elements 57.

In this embodiment, as shown in FIG. 12, the monitor 1 includes the display 2 for reproducing the picture, a monitor characteristics corrector 53 for correcting the picture signals R, G and B to the corrected picture signals R', G' and B', the reference signal generator 56, a correction value operator 58 for obtaining the correction values from the values measured by the color detector elements 57 and the characteristics such as the ideal chromaticity and reference white chromaticity of the ideal luminous bodies of the ideal display in the same manner as the first embodiment described above, a correction value memory 54 for storing the correction values fed from the correction value operator 58, and a signal composite unit 55 for composing the reference color signals sent from the reference signal generator 56 and the corrected picture signals output from the monitor characteristics corrector 53 and for defining the normal picture display area U and the reference color display area V of the display surface of the display 2 in accordance with the composed signals. When the correction of the picture signals R, G and B to the picture signals R', G' and B' is performed, the correction values are read out of the correction value memory 54 and are fed to the corrector 53.

In the sixth embodiment, the picture signals R, G and B are converted into the corrected picture signals R', G' and B' on the basis of the correction values read out of the correction value memory 54 in the monitor characteristics corrector 53, and the corrected picture signals obtained by the corrector 53 and the reference color signals generated by the reference signal generator 56 are sent to the signal composite unit 55. The composed signals are reproduced on the display 2.

Therefore, the picture displayed in the normal picture display area U is always color-corrected, and hence the maintenance for the colors is not required and the displayed colors are ensured in this monitor 1 until the function of the display 2 is so dropped down that the color correction of the picture signals may not be carried out any more in the corrector 53. Further, since the color detector elements 57 and the cover 51 for covering the elements 57 are detachably mounted in front of the display 2, they may be conveniently applied to another display of the same size.

In this embodiment, the same effects and advantages as those obtained in the previous embodiments can be also obtained.

Further, the display surface of the display is divided into the normal picture display area U and the reference color display area V, and the reference color picture signals of the reference colors of the reference color display area V can be picked up by the color detector elements 57 and be then fed to the correction value operator 58. Hence, the picture of the normal picture display area U is color-corrected based on the luminous conditions of the reference color display area V, and the color correction of the picture signals may be performed so as to always bring the colors of the picture on the display close to the actual colors without stopping the monitoring of the picture displayed based on the picture signals.

It is readily understood from the above description of the preferred embodiments that the differences of the colors of the pictures displayed on the different displays on the basis of the same picture signals picked up by the imaging camera can be removed, and therefore the same colors can be reproduced on the different displays having the different luminous characteristics from the same picture signals picked up by the camera. Hence, the color variations of the pictures displayed on the different displays can be effectively prevented.

Although the present invention has been described in its preferred embodiments with reference to the accompanying drawings, it is readily understood that the present invention is not restricted to the preferred embodiments described above and that various changes and modifications may be made in the present invention by a person skilled in the art without departing from the spirit and scope of the present invention.

What is claimed is:

1. A color picture display apparatus, comprising:
   display means for displaying a picture on the basis of picture signals picked up by an optoelectronic device:
   detecting means, arranged in front of the display means, for detecting luminous characteristics of the display means with reference to reference color signals for reference colors;
   processing means for processing the luminous characteristics of the display means and ideal luminous characteristics of an ideal display to obtain correction values; and
   correcting means for correcting the picture signals on the basis of the correction values to obtain corrected picture signals to be fed to the display means for displaying a corrected picture;
   the luminous characteristics of the display means including chromaticity and luminance, the ideal luminous characteristics of the ideal display including the chromaticity and reference white chromaticity.

2. The apparatus according to claim 1, further comprising means for storing the correction values obtained by the correcting means.

3. The apparatus according to claim 1, further comprising means for generating the reference color signals and switch means for selecting one of the correcting means and the generating means in order to connect the selected one to the display means.

4. The apparatus according to claim 1, wherein the correcting means includes a by-pass for avoiding the correction of the picture signals therein to allow the picture signals to be directly fed to the display means.

5. The apparatus according to claim 1, wherein the detecting means includes color detector elements.

6. The apparatus according to claim 1, further comprising means for generating the reference color signals and means for defining a display surface of the display means to a normal picture display area for displaying the picture on the basis of the picture signals and a reference color display area for displaying the reference colors of the reference color signals, the defining means being connected to the display means, the generating means and the correcting means, the color detector elements being arranged in front of the reference color display area.

7. The apparatus according to claim 6, wherein the color detector elements are detachably covered by a cover means.

8. The apparatus according to claim 6, wherein the reference color display area is positioned in a peripheral portion of the display surface of the display means.

* * * * *